March 10, 1959  M. DISPENZA  2,877,069
PISTON, WRIST PIN AND CONNECTING ROD ASSEMBLY
Filed May 10, 1957
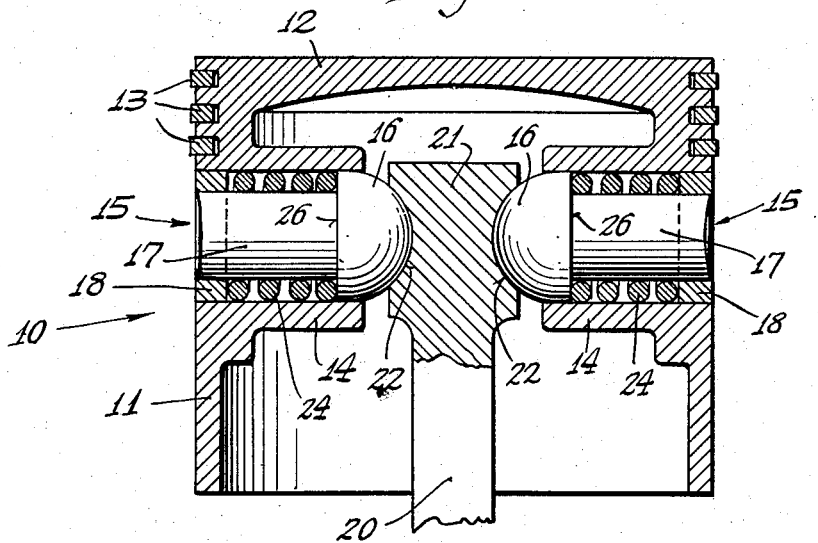
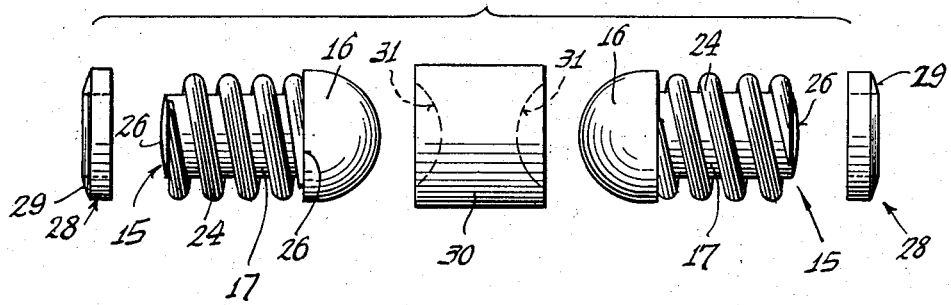
INVENTOR.
Michael Dispenza
BY
Munn, Liddy, Daniels & March
ATTORNEYS

United States Patent Office 2,877,069
Patented Mar. 10, 1959

2,877,069

PISTON, WRIST PIN AND CONNECTING ROD ASSEMBLY

Michael Dispenza, Brooklyn, N. Y.

Application May 10, 1957, Serial No. 658,453

5 Claims. (Cl. 309—20)

This invention relates to piston, wrist pin and connecting rod assemblies such as are commonly employed in reciprocating internal combustion engines and the like.

An object of the invention is to provide a novel and improved piston, wrist pin and connecting rod structure by which wear is automatically taken up, thereby to obviate the necessity for servicing and replacement operations.

Another object of the invention is to provide an improved wrist pin and connecting rod structure as above characterized, which may be incorporated in existing pistons without requiring appreciable change thereof.

A still further object of the invention is to provide a novel and improved wrist pin construction for existing pistons and connecting rods, such construction being characterized by automatic take-up of the wear, and being readily adaptable for use with usual types of pistons and connecting rods as produced at the present time.

Yet another object of the invention is to provide an improved wrist pin and connecting rod construction having all of the above advantages and which is nevertheless extremely simple, constituted of relatively few components or parts, and economical to fabricate and manufacture.

Other features and advantages will hereinafter appear.

In the drawings accompanying this specification, similar characters of reference indicate corresponding parts wherever possible in the several views, in which:

Figure 1 is an axial sectional view of a piston having incorporated therein the improved wrist pin and connecting rod structure of the invention.

Fig. 2 is an exploded elevational view of an improved wrist pin assembly adaptable for use with existing connecting rods and pistons, as provided by the invention.

Referring first to Fig. 1, there is shown a usual type of piston 10 having cylindrical side walls 11, a top wall 12 and piston rings 13. The piston 10 has inwardly extending bosses 14 provided with aligned bores disposed transversely of the piston, such bores extending through the cylindrical side walls 11 thereof, as shown.

In accordance with this invention I provide a novel and improved wrist pin and connecting rod structure, in conjunction with the piston 10. This improved structure comprises a pair of plungers 15 disposed respectively in the said bores and having rounded inner ends 16. The rounded ends 16 are in the form of enlargements or heads, and slidably bear in the bores of the bosses 14. The plungers 15 further comprise shanks 17 of diameter smaller than the heads 16, and such shanks slidably bear in ring-like or annular members 18 disposed in the bores of the bosses 14 and preferably fixedly secured therein. By this organization, the plungers 15 are axially slidably movable in the bosses 14.

For engagement with the rounded ends of the plungers 15 there is a connecting rod 20 having an enlarged end portion 21 provided with a pair of oppositely located sockets 22 adapted to receive and engage the rounded ends or heads 16 of the plungers 15.

For the purpose of urging the plungers 15 toward each other and maintaining the rounded ends 16 thereof in the sockets 22 I provide helical compression coil springs 24 surrounding the shanks 17 of the plungers and abutting the annular members 18 which are secured in the piston 10. The springs 24 engage shoulders 26 formed by the enlarged ends 16 of the plungers.

It will be understood that the compression springs 24 are normally compressed an appreciable extent, thereby to exert strong forces against the heads 16 so as to maintain said heads firmly in engagement with the enlarged end 21 of the connecting rod 20. Accordingly, the said connecting rod is pivotally secured to the piston 10 so as to have movement similar to that provided by the usual connecting rod and wrist pin construction heretofore provided in pistons. However, with the above structure as provided by the invention, it is not necessary to service the wrist pin and connecting rod structures when these become worn, as is necessary with prior structures now commonly in use. It will be readily understood that when wear occurs between the rounded heads 16 and the enlarged end 21 of the connecting rod 20, such wear will be taken up by virtue of the provision of the compression springs 24. As the wear occurs, the said springs will by continually urging the plungers 15 toward each other, take up the wear and prevent any looseness from occurring between the connecting rod and plungers.

It will be further understood that when the piston 10 is disposed in a cylinder and is reciprocating therein, it will be impossible for the connecting rod 20 to become disengaged from the plungers 15. It will be noted that the outer ends of the shanks 17 of the plungers will be in abutting relation to the inside walls of the cylinders in which the piston 10 reciprocates, and accordingly the plungers 15 will be prevented from having any appreciable separating movement. Thus, it is assured that the connecting rod 20 will at all times remain engaged with the enlarged heads 16 of the plungers, even when unexpectedly great loads or forces are encountered.

In accordance with this invention I also provide a novel and improved wrist pin assembly adaptable for use with existing pistons and connecting rods. Referring to Fig. 2, this improved wrist pin assembly comprises the plungers 15 with enlarged heads 16, such plungers having shanks 17 on which the springs 24 are carried, as with the construction illustrated in Fig. 1. However, the shanks 17 of the plungers 15 may be provided with spherical surfaces 26 at their remote ends. I further provide annular abutment members, adapted to slidably receive the shanks 17 and adapted to be secured in the wrist pin bearings of a piston so as to constitute stops for engagement by the ends of the springs 24. The annular members 28 have spherical end faces 29 as shown, to enable them to closely fit the inside walls of the cylinder.

The wrist pin assembly further comprises a central block 30 having a pair of oppositely disposed sockets 31 adapted to receive the enlarged rounded end portions 16 of the plungers 15. The block 30 has a cylindrical outer surface by which it may be fitted into the wrist pin end of a usual type of connecting rod.

It will be understood that the wrist pin construction as illustrated in Fig. 2 may be used with existing piston and connecting rods, in place of the usual solid, one-piece type of wrist pin now employed. With my improved wrist pin assembly, wear which occurs during use of piston will be automatically taken up by the compression springs 24. Thus there is obviated the need for servicing of the piston, wrist pin and connecting rod assembly, as with the construction of Fig. 1.

It will be noted that, in accordance with the structure set forth above, I have provided a novel and improved organization of piston, wrist pin and connecting rod by which servicing operations are eliminated. With my improved construction, wear is automatically taken up as it occurs, through the provision of the compression coil springs 24. Thus, no looseness will occur as a consequence of such wear, and replacement or refinishing of the components is unnecessary.

Variations and modifications may be made within the scope of the claims, and portions of the improvements may be used without others.

I claim:

1. The combination of a piston having a pair of aligned transverse bores in opposite portions of its side walls; a pair of plungers disposed respectively in said bores, said plungers having reduced shanks, and having rounded inner ends bearing in said bores; a connecting rod having a pair of oppositely-located sockets at one end, said end being disposed between said plungers and the rounded ends of the latter being engaged in said sockets; yieldable means in said bores urging the plungers toward each other and maintaining the rounded ends thereof in the said sockets; and annular members fixed in said bores, in which members the shanks bear at their ends, said plungers each having a two-point bearing surface, one surface being on the rounded inner end and the other surface being on the shank.

2. The combination of a piston having a pair of aligned transverse bores in opposite portions of its side walls; a pair of plungers disposed respectively in said bores, said plungers having rounded inner ends; a connecting rod having a pair of oppositely-located sockets at one end, said end being disposed between said plungers and the rounded ends of the latter being engaged in said sockets; and yieldable means in said bores, urging the plungers toward each other and maintaining the rounded ends thereof in the said sockets, said plungers having heads bearing in said bores and constituting the said rounded ends, said yieldable means comprising helical coil springs disposed in said bores, and said plungers having shanks passing through said coil springs.

3. The invention as defined in claim 2, in which there are annular members fixedly secured in said bores and constituting abutments engaging the ends of said springs.

4. A wrist pin assembly for a piston, comprising a pair of plungers having rounded ends, a block having a pair of oppositely disposed sockets adapted to receive the rounded ends of the plungers; helical coil springs carried by said plungers; and annular members slidable on said plungers and adapted to abut the said springs, said plungers, springs and members being receivable in the wrist pin bearings of a piston and said block being adapted for mounting in the recessed end of a connecting rod.

5. The invention as defined in claim 4, in which the plungers have enlarged heads constituting the said rounded ends, and have shanks adapted to carry the said springs, said shanks being receivable in the said annular members.

References Cited in the file of this patent

UNITED STATES PATENTS 1,749,024     Fennel                Mar. 4, 1930